United States Patent [19]

Bresan

[11] 4,086,453
[45] Apr. 25, 1978

[54] GAME TRACKING DEVICE

[76] Inventor: Joseph R. Bresan, P.O. Box 8611, Greensboro, N.C. 27410

[21] Appl. No.: 733,992

[22] Filed: Oct. 20, 1976

[51] Int. Cl.² .................. H01H 3/02; H01H 35/00
[52] U.S. Cl. ............................ 200/52 R; 200/85 R
[58] Field of Search .................. 200/33 R, 35 R, 41, 200/61.59, 52 R, 85 R; 58/152 R, 145 R; 119/1, 29, 51.11, 51.14

[56] References Cited

U.S. PATENT DOCUMENTS

| 779,434 | 1/1905 | Lyon | 119/51.14 |
| 2,188,511 | 1/1940 | Leighton | 200/85 R X |
| 2,214,232 | 9/1940 | Marck | 200/35 R X |

*Primary Examiner*—James R. Scott
*Attorney, Agent, or Firm*—Thomas A. Lennox

[57] ABSTRACT

A novel device is provided to determine the traveling habits of game, in particular, deer.

A battery operated timer is started with a pressure switch kept in the "on" position by the pressure of a tidbit, such as an apple, or a switch lever. The device is placed in a known deer trail and when the animal removes the tidbit, the timer stops. The hunter may determine when the animal passed that particular location.

7 Claims, 4 Drawing Figures

GAME TRACKING DEVICE

BACKGROUND OF THE INVENTION

Hunters of game, and particularly deer hunters using bows and arrows, need to know not only where the game travels but also its traveling habits in regard to time. While some game may be stalked with guns or rifles, the hunter using limited range weapons such as a bow and arrow, generally has to wait for the game to come to him.

An effective method of hunting deer with bow and arrows is to take a position, generally elevated in a tree, along a path known to be traveled by the deer. Unfortunately, the deer season is usually during cold weather. Since long waits are not uncommon, the sport tends to be extremely uncomfortable at best, and almost impossible if the hunter is not fortunate in finding the game quickly. When the deer hunter takes his position ten or twenty feet in the air, even with the best equipment, it is not possible for him to resist the coldest weather for more than a few hours. Placed in that position, he must remain absolutely still for fear of being seen by the deer. In his unshielded position, the sport can be extremely unrewarding unless the hunter's timing is right.

It is therefore imperative that the hunter not only know where the deer pass, but also at what time of the day they pass a particular position. Prior to the invention of my device, the timing of the hunter depended upon mere guesswork or clues located along the trail. Deer are creatures of habit and tend to follow the same trail at approximately the same time each day. Prior to my invention, it was essentially impossible to know when a deer passed a particular point. Since the hunter did not know the deer's starting point, knowledge of deer habits was of little value. If the deer started close to the stake-out point, he might pass there early in the morning. Conversely, if he started very far from this stake-out point, he might not arrive there until evening. In general, the deer hunter with the bow and arrow had to rely on his guesswork.

The difficulties described above with respect to hunting deer are typical problems encountered with other game, including bear and turkey. The signs at the location will readily tell the hunter what type of animal passed that point.

In addition, it is of great interest to naturalists to study the habits of animals. While devices have been developed for studying animals in captivity, there is a great need for devices to study the time related habits of animals in the wild. There is a particular need to provide devices which will not upset the natural habits of game, but yet allow detailed and accurate study of their time related habits.

Devices to study animals have been developed, including U.S. Pat. No. 3,304,911, to Hiroshi Hakatta et al., which describes an apparatus for automatically measuring the movement of an animal, within a defined area using an electric eye system. U.S. Pat. No. 3,100,473 to J. W. Kissel, describes an apparatus for measuring animal activity within a movable, cylindrical container. U.S. Pat. No. 2,663,282 to Ingle, describes a fatigue machine for rats.

Timing devices have been developed such as that described in U.S. Pat. No. 631,034 to Bielitz, illustrating a time check for doors, and U.S. Pat. No. 1,626,620 to Mentzer, describing an automatic race-track timing device. Other timing devices include stopwatch type devices as described in U.S. Pat. No. 3,723,675 to Richey, and U.S. Pat. Nos. 2,986,683 and 3,168,690 to M. J. Lavet, et al. which together describe battery powered clocks or timers.

None of the prior art described hereinabove satisfies the needs of determining the time related habits of animals in the wild.

It is therefore an object of this invention to provide means for determining the traveling habits of animals in the wild without interfering with their natural activities.

It is a further object of this invention to provide a device which will allow the determination of the exact time that an animal passes a particular location in it natural habitat.

It is an additional object of this invention to provide a device which will allow a hunter to determine the exact time of day that game have previously traveled past a particular point in the wild.

It is a more specific object of this invention to provide a device to aid bow and arrow deer hunters in determining a suitable location to wait for the approach of the deer.

SUMMARY OF THE INVENTION

The tracking device of this invention includes a timing device powered by a portable power source such as a dry-cell battery.

The timing device includes a circuit which is broken between the power source and the timing device into which a pressure switch is electrically connected in the circuit. A device is provided to hold a tidbit such that the tidbit itself being on the device or being removed by the animal controls pressure on the pressure switch. Pressure by the tidbit or removal of the tidbit controls the switch position and placed the timing device in either the "off" or the "on" mode.

The tracking device is used to determine the movement of wild game, such as deer. The timing device such as a battery powered timer is generally placed out of sight. A tidbit which would be readily eaten by the game being stalked, such as an apple for deer, is placed on the tidbit holding device which depresses the pressure switch keeping the timer movement either on "on" or "off" mode by control of the power circuit.

The timer is adjusted to a starting position. The location is then left unattended for a period of time as long as the dial capacity of the timing device. When the hunter returns and finds the tidbit missing, he reads the timing device and readily determines what time the game passed that position.

DESCRIPTION OF THE PREFERRED EMBODIMENT

Figure 1:
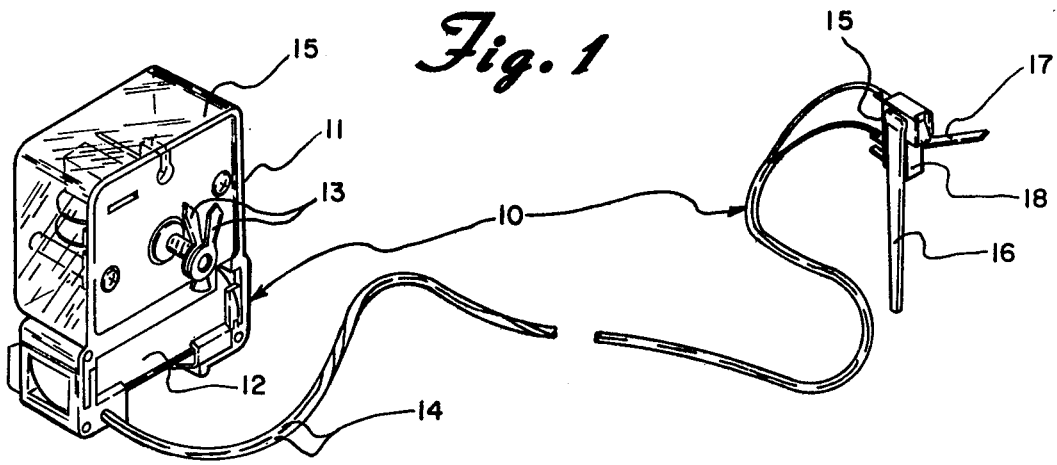
FIG. 1 is a perspective view of the device of this invention using a remote switch connected to the timer.

An embodiment of the game tracking device 10 is shown in FIG. 1. Timer 11 is a device known in the art, more particularly described in U.S. Pat. No. 2,986,683 to M. J. Lavet, et al., issued May 30, 1961, and U.S. Pat.

No. 3,168,690 issued Feb. 2, 1965, to the same inventor; both patents assigned to Societe Anonyme Etablissements Leon Hatot, Paris, France. Timer 11 is a commercially available item manufactured and marketed by Westclox, as a division of General Time - Talley Industries, Lasalle, Ill., as Model No. GT360. Timer 11 is powered by dry-cell battery. 12 The time elapsed is determined by clock hands 13 powered by the mechanism described in the patents to Lavet hereinabove. Wires 14 electrically connect into the circuit between battery 12 and power mechanism within case 15. Pressure switch 15 is connected to wires 14 such that when the switch is under compression, timer 11 is in an "on" mode, with timer hands 13 moving. Switch 15 is rigidly connected to spike 16 which may be pressed into the earth to hold switch 15 in position. Lever 17 provides continuous pressure on switch 15 when downward force is applied and spring 18 returns lever 17 to a position out of contact with switch 15 when the downward force is removed.

Figure 2:
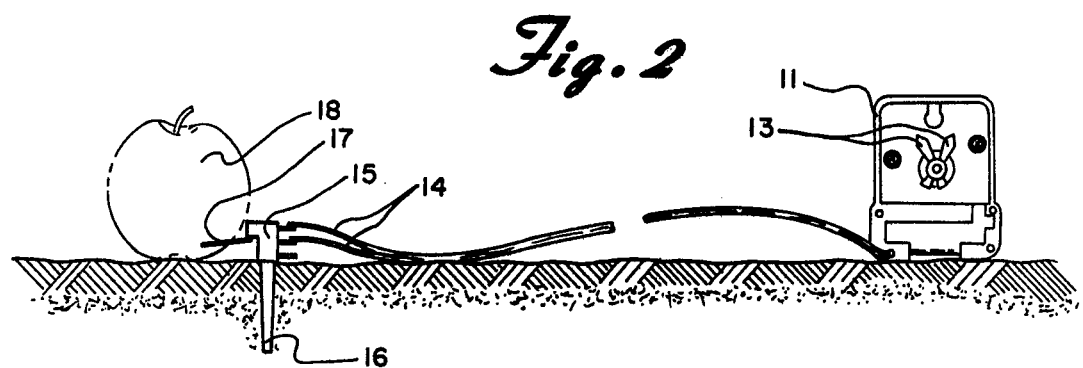
FIG. 2 is a side view of the device installed in position for use.

FIG. 2 is a side view of game tracking device 10 in position to determine the habits of the game. Timer 11 generally placed out of view with wires 14 extending on to a known path of the animals sought. The wires are preferably color camouflaged to blend into background and may be covered with earth or leaves. Spike 16 is pushed into the earth holding switch 15 in position. Lever 17 is dispressed by placing on it a tidbit such as an apple 18 holding switch 15 under pressure and maintaining timer 11 in an "on" mode, with hands 13 moving.

Figure 3:
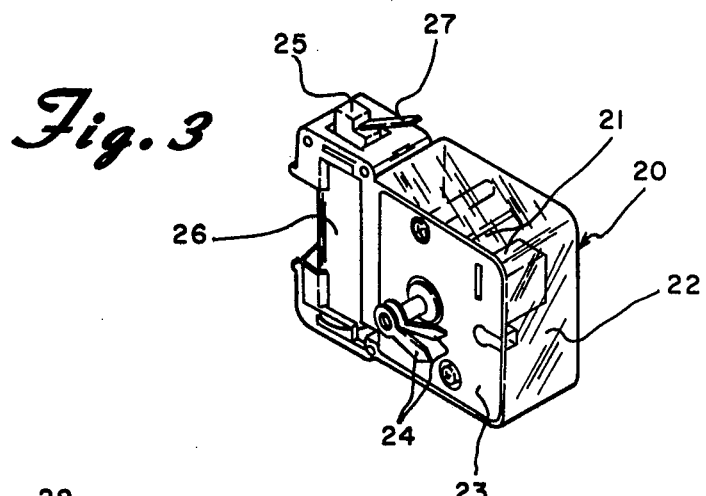
FIG. 3 is a perspective view of the device of this invention wherein the pressure switch is connected directly to the case of the timer.

FIG. 3 is a perspective view of game tracking device 20. Timing mechanism 21 as described in Lavet, supra, is enclosed in transparent case 22 including clock face 23. Hands 24 are connected to timing mechanism 21 and caused to move when pressure switch 25 is not placed in compression. In this embodiment placement of downward pressure on lever 27 maintains timing mechanism 21 in an "off" mode. Timing mechanism 21 is powered by battery 26 which is interrupted when pressure is applied to switch 25 through lever 27. While the above embodiments have shown a lever connected to the pressure switch, compression may be provided directly by a pan positioned over a micro-pressure switch. The tidbit is placed on the pan depressing the switch maintaining the timer in either an "on" or "off" mode until the tidbit is removed, changing the timer mode to the opposite mode condition.

Figure 4:
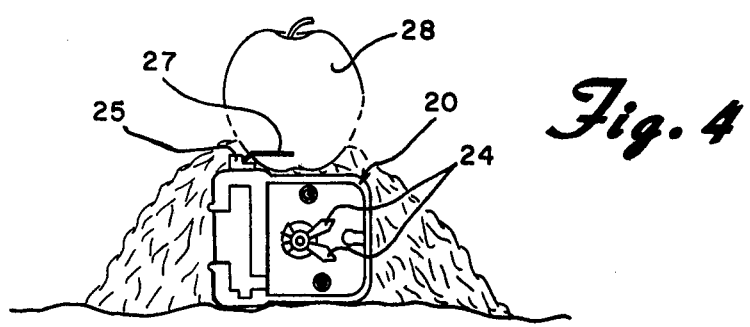
FIG. 4 is a side view of the device installed in position for use.

FIG. 4 is a side view of deer tracking device 20 shown in position to collect data. Apple 28 is placed on lever 27 depressing pressure switch 25 maintaining timing mechanism 21 (not shown) in an "off" mode such that timing hands 24 are not moving. When apple 28 is removed allowing pressure siwtch 25 to be out of compression, the timing mechanism and thus hands 24 move to measure a time interval.

Other timing devices, powered by batteries, may be easily substituted for timers 11 and 21. It is necessary, however, that the power circuit of the timer be able to be broken and wires connected at the break to both sides of the circuit on to which the pressure switch is electrically connected.

It is preferred that the timing mechanism be protected from the elements out of doors. The mechanism may be placed in a hard closable container such as a wooden box, a glass screwtop jar or a paper packing box which has been water-proofed with varnish or other coating. In damp or wet areas, it may be desirable to encase the entire mechanism in a plastic bag and seal it completely from the elements. It is preferred that the entire mechanism be waterproof. The timing mechanism 11 is generally positioned out of sight of the game or of people. This is most easily accomplished by placing it next to a tree and piling pine needles, leaves or a leaf-covered branch over the device.

Lead wires 14 to pressure switch 15 are preferably colored to blend into the ground. It is preferred that the lead wires be covered with needles, leaves or soil to avoid suspicion by the game.

Spike 16 firmly attached to pressure switch 15 is driven into the ground near the stake-out point. Lever extension 17 on switch 15 is allowed to extend outwardly and upwardly from the ground. Lever extension 17 is small by comparison with tidbit 18 left for the game. Apple is particularly effective for deer and it is placed on lever extension 17 of pressure switch 15 depressing it and keeping the timing mechanism in the "on" mode. Additional tidbits, such as apples, may be scattered around the area, to make sure that the game does not miss the stake-out area. The tidbit would be chosen to specifically appeal to the game sought and while an apple would also be effective for bear, a corncob is suggested for turkey. As in FIGS. 1 and 2, pressure switch 15 and the circuit has been designed to turn 12 hour timer 11 off when tidbit 18 is removed by the animal. Thus, if tracking device 10 of this invention is set at 6:00 A.M. and the deer removes the apple at 2:00 P.M., a check at any time in the evening will show the timer ran for eight hours before being shut off and that the deer passed the stake-out point at 2:00 P.M.

The switch and electrical mechanism shown in FIGS. 3 and 4 provides that the switch turns on timing mechanism 21 when tidbit 28 is removed. In that embodiment of the invention, timer 21 in the "off" mode when tracking device 20 is set out. When tidbit 28 is removed, pressure switch 25 turns on timing mechanism 21. Thus, if tracking device is set out at 6:00 A.M. and the deer removes the apple at 2:00 P.M., a check at 7:00 P.M. in the evening will show timer mechanism 21 ran for 5 hours after the deer ate the apple. A simple calculation shows that from 2:00 P.M. to 7:00 P.M. is five hours and that the apple was removed at 2:00 P.M.

The device utilizing the pressure switch to turn off the clock mechanism is preferred. With this system, it is known when the device is set at the stake-out point whether the clock mechanism is operating. It is better to determine at that time if there is a connection problem or if the power source is drained. In the alternative switching method, wherein the clock does not turn on until the tidbit is removed, a loose connection or a dead battery would not be found until the day had been wasted. A twenty-four hour face capacity timing means is preferred. Pressure switches 15 and 25 are standard commercially available components such as manufactured by Cherry under trademark "SA" circled; Part No. E62-10. 1A 250 VAC/10. 1A ¼ HP 125 VAC.

An additional advantage of the device has been discovered, that being that when a hunter goes into a strange hunting area that he is not familiar with, he can place several devices to evaluate many promising hunting locations at the same time. Thus, while he may wish to remain in one position to observe the game first hand he can be, at the same time, evaluating many different positions throughout the forest. In addition, the device also increases the accuracy of the game habits study. Inasmuch as there is no human in the area of the test site, the game would not be frightened away by the sight of or by the smell of the hunter if he were downwind. When the hunter retrieves the tracking device, he can observe the direction the game approached the stake-out point. He can not only determine the type of game involved but also can choose his position so as to avoid being seen or smelled by the game.

While I have described my invention in connection with specific embodiments, it is to be clearly understood that this description is made only by way of example and not as a limitation to the scope of my invention as set forth in the following claim.

I claim:

1. A tracking device to determine the time of the day when an animal first comes to a staked-out location comprising:
    (a) a timing means powered by connection through an electrical circuit to a portable power source;
    (b) a pair of lead wires connected to a break in the electrical circuit between the power source and the timing means;
    (c) a pressure switch electrically connected to the two lead wires capable of completing and interrupting the circuit between the power source and the timing means; and
    (d) a tidbit holding means for holding tidbit very appetizing to the animal and being connected to the pressure switch such that when the tidbit is placed on or removed from the tidbit holding means, that placement or removal controls the on-off position of the switch and changes the running of the time means to the opposite mode.

2. The tracking device of claim 1 wherein the pressure switch is rigidly attached to a spike capable of being pressed into the ground holding the pressure switch in position and wherein the tidbit holding means is a lever extension in an outward and upward position connected to the pressure switch.

3. The tracking device of claim 1 wherein the pressure switch is electrically connected such that when the tidbit holding means is depressed downwardly due to holding a tidbit, the timing means is in an "on" mode and when the tidbit holding means is allowed to rise by removal of the tidbit, the timing means is switched to an "off" mode.

4. The tracking device of claim 1 wherein the power source is a dry-cell battery.

5. The tracking device of claim 1 wherein the timing means is a twelve-hour clock powered by a dry-cell battery.

6. A tracking device to determine the time when an animal first comes to a particular location in its natural habitat comprising:
    (a) a housing containing a timing means powered by and electrically connected through a circuit to a dry-cell battery;
    (b) a pair of lead wires connected to a break in the electrical circuit between the dry-cell battery power source and the timing means;
    (c) a pressure switch rigidly attached to the housing and electrically connected to lead wire with the switch controlling the current flow between the dry-cell battery and the timing means; and
    (d) a tidbit holding means capable of holding a tidbit very appetizing to the animal, said tidbit holding means in pressure contact with the pressure switch in position that when the tidbit is placed on or removed from the tidbit holding means the pressure switch is controlled and places the timing means in the opposite running mode than it was before the tidbit was placed on or removed from the tidbit holding means.

7. The tracking device of claim 6 wherein the pressure switch is electrically connected such that when the tidbit holding means is pressed downwardly due to placement of a tidbit on the tidbit holding means, the timing means is placed in an "on" running mode and when the tidbit holding means is allowed to rise by removal of the tidbit, the timing means is switched to an "off" mode.

* * * * *